United States Patent [19]
Wiart

[11] 3,879,646
[45] Apr. 22, 1975

[54] SYSTEM FOR ADJUSTING AND COMMUTATING CURRENT IN THE WINDINGS OF AN AC MACHINE FROM A CONSTANT-VOLTAGE DC SUPPLY

[75] Inventor: Albert Wiart, Val d'Oise, France

[73] Assignee: Jeumont Schneider, Puteaux (Hauts de Seine), France

[22] Filed: July 23, 1973

[21] Appl. No.: 382,042

[30] Foreign Application Priority Data
July 25, 1972 France .................. 72.26727

[52] U.S. Cl. .............. 318/138; 318/227; 318/231
[51] Int. Cl. .......................................... H02k 28/00
[58] Field of Search .......... 318/138, 230, 227, 231; 321/45 C

[56] References Cited
UNITED STATES PATENTS

| | | |
|---|---|---|
| 3,262,036 | 7/1966 | Clarke et al. ............. 318/138 X |
| 3,354,370 | 11/1967 | Corry et al. ............. 318/227 |
| 3,384,804 | 5/1968 | Salihi ............. 318/227 X |
| 3,406,325 | 10/1968 | Rosa ............. 318/227 X |
| 3,525,100 | 8/1970 | Duff ............. 318/138 X |
| 3,639,819 | 2/1972 | Wiart ............. 318/138 |

Primary Examiner—G. Z. Rubinson
Attorney, Agent, or Firm—Raymond A. Robic; Arthur Schwartz; Louis Allahut

[57] ABSTRACT

System enabling an AC machine to have the characteristics of a DC machine. The system comprises a chopper ($T_{10}$), a smoothing choke ($L_1$), a thyristorized routing bridge for switching the current in the motor M ($T_1$ to $T_6$), two turn-off circuits ($C_1$, $T_7$, $T'_7$, $T_8$, $T'_8$), two switching circuits ($C_2$, $C_3$) and two circuits for discharging the capacitors ($C_2$, $C_3$) (one in association with ($T_9$) and the other in association with ($L_3$). A diode bridge ($D_{11}$ to $D_{16}$) is interposed between, on the one hand, the routing bridge, and, on the other hand, the turn-off and switching circuits. The system is of use for speed controllers and traction motors.

13 Claims, 3 Drawing Figures

3,879,646

SYSTEM FOR ADJUSTING AND COMMUTATING CURRENT IN THE WINDINGS OF AN AC MACHINE FROM A CONSTANT-VOLTAGE DC SUPPLY

This invention relates to a system for adjusting and commutating current in the windings of a single-phase or polyphase AC machine, more particularly an asynchronous squirrel-age motor, so that it can provide a number of speeds and torques when energized from a constant-voltage DC supply.

The Applicant's U.S. patent application Ser. No. 305,431 of Nov. 10, 1972, now Pat. No. 3,815,003 issued on June 4, 1974 discloses the underlying idea of systems which can provide from a constant-voltage DC supply adjustable direct currents which are consecutively routed in repetitive cycles to the various phases of the AC machine so as to energize the same at a variable frequency and variable voltage and thus control the speed and torque of the machine.

A system for adjusting and commutating current in the windings of an AC machine (of $n$ phases) from a constant DC supply, is characterized in that the system comprises, in series with the terminals of the supply:

a current chopper as a means of obtaining DC currents of an adjustable given value from the supply;

an inductance for smoothing the currents thus provided;

a thyristorized routing bridge which has $2n$ arms and whose $n$ centre points are connected to the $n$ phase terminals respectively of the machine and in which the ends of each of the two commutating groups are connected to the chopper output and to the smoothing-choke input, respectively, the bridge being controlled to route the adjustable DC output from the chopper cyclically through the windings of the $n$ phases of the machine and the smoothing choke;

a semiconductor commutating bridge which has two $n$ arms and whose $n$ centre points are connected to the $n$ phase terminals respectively of the machine and in which the ends of each of the two commutating groups are connected to a circuit for turning-off the routing-bridge thyristors and to a switching circuit for progressively transferring the commutating-bridge current to the routing bridge;

for each cummutating group of the routing bridge, a turn-off circuit for the thyristors of such group, such circuit being connected between the group and the corresponding commutating group of the commutating bridge;

for each commutating group of the commutating bridge, a switching circuit connected between the routing bridge and the commutating bridge, and for each switching circuit, at least one circuit for discharging the charge stored in the switching circuits.

The invention will be more clearly understood if reference is made to an embodiment relating to a three-phase machine and to the accompanying drawings wherein.

Figure 1:
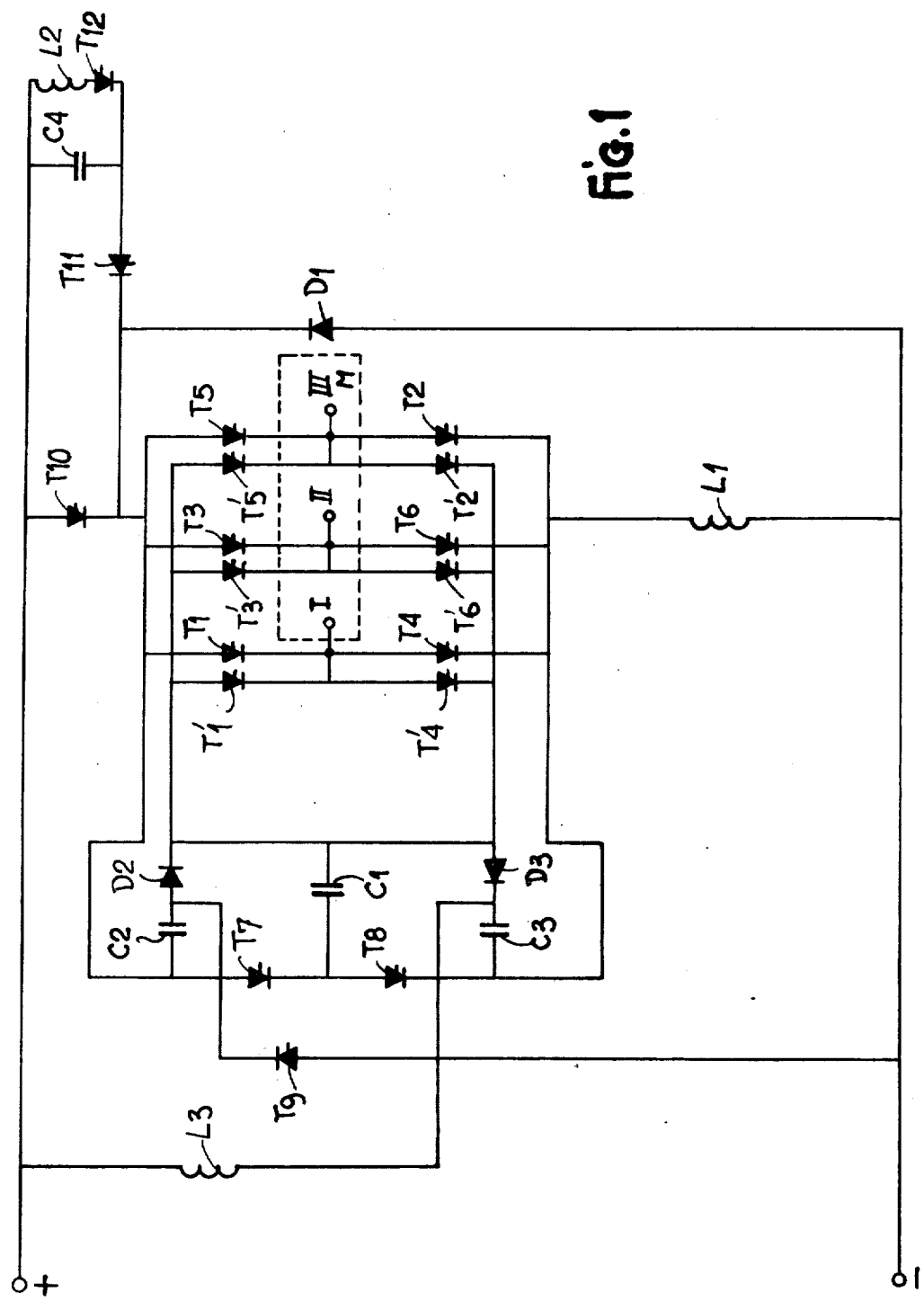
FIG. 1 shows a system comprising a thyristorized commutating bridge, a turn-off circuit and two switching circuits.

In FIG. 1, the constant-voltage DC supply energizing the system is represented by its positive and negative (+ and −) terminals. The chopper, which is of known kind, comprises a main thyristor $T_{10}$, a turn-off thyristor $T_{11}$, a turn-off capacitor $C_4$ and its charge-reversing circuit comprising a choke $L_2$, a thyristor $T_{12}$ and a freewheel diode $D_1$. The routing bridge, which comprises six thyristors $T_1$, $T_3$, $T_5$, $T_4$, $T_6$, $T_2$, has its three centre points connected to phase terminals I, II, III respectively of a three-phase machine M and has the ends of its two commutating groups $T_1$, $T_3$, $T_5$ and $T_4$, $T_6$, $T_2$ connected respectively to the chopper output and to the input of smoothing choke $L_1$. The routing bridge is controlled by a known logic device enabling the adjustable DC output by the chopper in series with the choke $L_1$ to be cyclically routed through the three phase windings I, II, III of machine M. The commutating bridge, which comprises six thyristors $T'_1$, $T'_3$, $T'_5$, $T'_4$, $T'_6$, $T'_2$, arranged like the thyristors of the routing bridge, has its three centre points connected to the machine phase terminals, I, II, III respectively. Connected between the anodes of the routing-bridge thyristors $T_1$, $T_3$, $T_5$ and the anodes of the commutating-bridge thyristors $T'_1$, $T'_3$, $T'_5$ are:

the turn-off circuit for the routing-bridge thyristors $T_1$, $T_3$, $T_5$, comprising a capacitor $C_1$ and a thyristor $T_7$, and a circuit providing switching between the routing half-bridge $T_1$, $T_3$, $T_5$ and the commutating half-bridge $T'_1$, $T'_3$, $T'_5$, the switching circuit comprising a capacitor $C_2$ and a diode $D_2$.

Connected between the cathodes of the routing-bridge thyristors $T_4$, $T_6$, $T_2$ and the cathodes of the commutating-bridge thyristors $T'_4$, $T'_6$, $T'_2$ are:

a turn-off circuit for the routing-bridge thyristors $T_4$, $T_6$, $T_2$, comprising the capacitor $C_1$ and a thyristor $T_8$, and a switching circuit between the routing half-bridge $T_4 T_6$, $T_2$ and the commutating half-bridge $T'_4$, $T'_6$, $T'_2$, such circuit comprising capacitor $C_3$ and diode $D_3$.

The discharge circuit for restoring to the machine M the energy stored in capacitor $C_2$ at commutations from the half-bridge $T'_1$, $T'_3$, $T'_5$ to the half-bridge $T_1$, $T_3$, $T_5$ takes the form of a thyristor $T_9$, while the discharge circuit for returning to the supply the energy stored in the capacitor $C_3$ at commutations from the half-bridge $T'_4$, $T'_6$, $T'_2$ to the half-bridge $T_4$, $T_6$, $T_2$ is embodied by a choke $L_3$.

Details of the operation of the system shown in FIG. 1 are as follows:

It will be assumed that at a particular time motor M is being energized via its terminal I and thyristor $T_1$ and that it is required to route the load to terminal II. Thyristor $T_1$ is turned-off by turning-on thyristors $T_7$ and $T'_1$. Capacitor $C_1$, which is charged to its rated charge at the supply voltage (positive polarity on the right-hand side), raises the cathode of $T'_1$ and therefore of $T_1$ to a potential above the potential of the anode of $T_1$, which turns off. $C_1$ discharges through the motor via $T'_1$.

$T_3$ is turned on. The motor load current, which because of the choke $L_1$ is substantially constant, flows through $T_7$, $C_1$ and $T'_1$ and recharges the capacitor $C_1$ but the opposite way round; when $C_1$ has been recharged to its nominal value, the motor current flows through the two parallel circuits $T_7$, $C_1$ and $C_2$, $D_2$, charging $C_1$ and $C_2$ above their nominal value, so that the cathode of $T'_1$ receives potentials which decrease gradually in relation to the cathode of $T_3$, so that the load is transferred gradually from $T'_1$ to $T_3$, $T'_1$ and $T'_7$ turning-off.

When $T_9$ is turned-on at the next turning-on of the chopper thyristor $T_{10}$, the excess charge stored in capacitor $C_2$ during the switching from $T_1$ to $T_3$ is restored to the motor M, $T_9$ turning-off automatically when the voltage of capacitor $C_2$ has returned to its nominal value, which is the supply voltage, since the motor is then being energized via thyristor $T_{10}$.

The operation is similar for a commutation from terminal I through thyristor $T_4$ to terminal II through thyristor $T_6$. Thyristor $T_4$ turns off when thyristors $T'_4$ and $T_8$ turn on, capacitor $C_1$ having been charged up the opposite way round during the previous commutation of the top half-bridge, whereafter $T_6$ is turned on. The charging current reverses the charge of $C_1$ and charges $C_1$ and $C_3$ in parallel, via $T'_4$, $C_1$, $T_8$ and via $T'_4$, $D_3$, $C_3$, respectively, so that the load is gradually switched from $T'_4$ to $T_6$. The excess charge of $C_3$ is returned to the supply through the choke $L_3$.

The capacitor $C_1$, whose only function is to turn off the routing-bridge thyristors, is of relatively reduced capacitance so that its discharge time is limited to the turn-off time of the latter thyristors, but the capacitors $C_2$, $C_3$ are appreciably larger so as to limit the voltage increase across them at switching.

Figure 2:
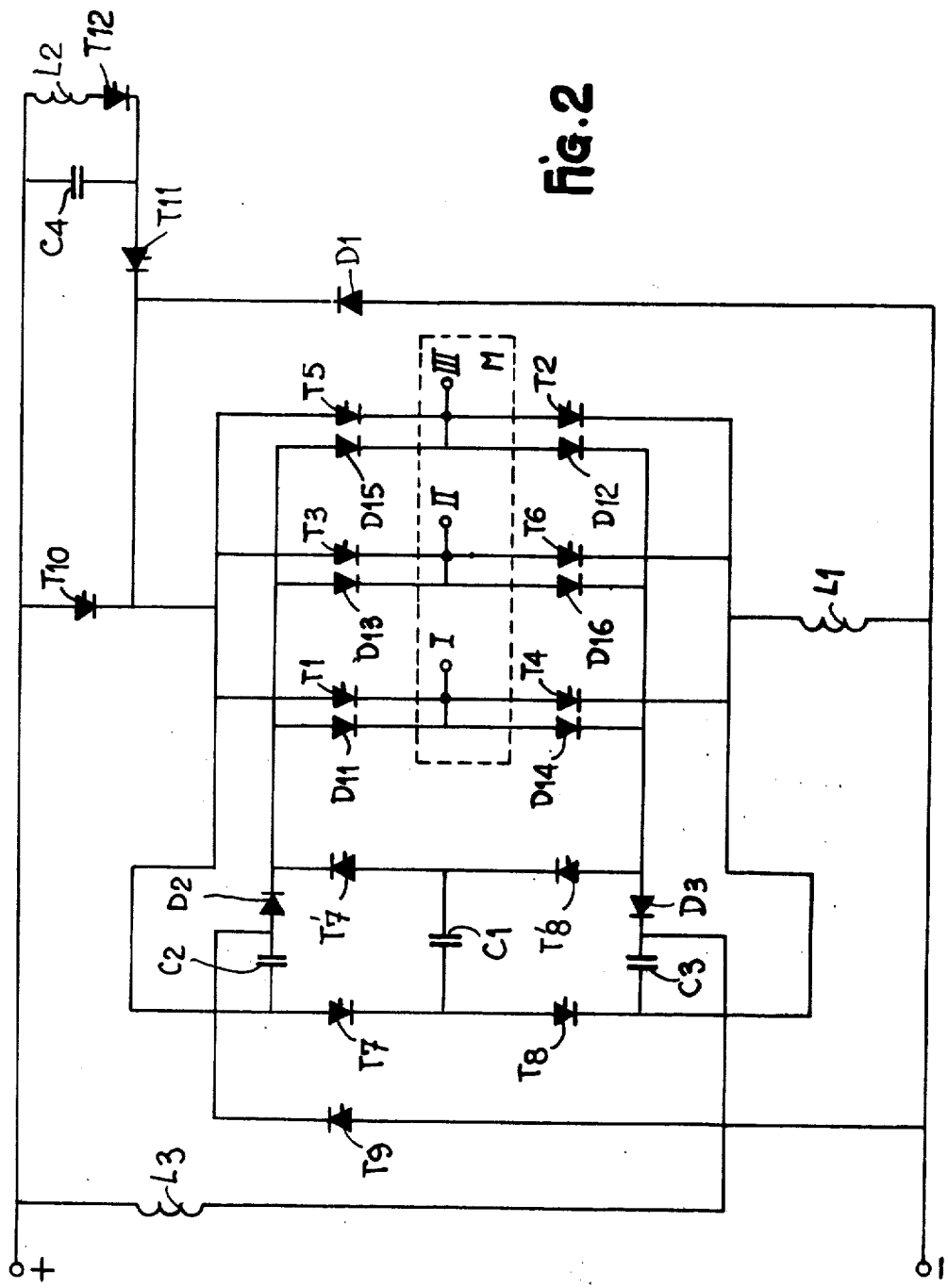
FIG. 2 shows a system comprising a diode commutating bridge, a turn-off circuit and two switching circuits.

The system shown in FIG. 2 is very similar to the system shown in FIG. 1 except that the thyristorized commutating bridge $T'_1$, $T'_3$, $T'_5$, $T'_4$, $T'_6$, $T'_2$ of FIG. 1 is replaced by a diode commutating bridge $D_{11}$, $D_{13}$, $D_{15}$, $D_{14}$, $D_{16}$, $D_{12}$ and the routing-bridge turn-off circuits also comprise a thyristor $T'_7$, for turning-off the half-bridge $T_1$, $T_3$, $T_5$, and the thyristor $T'_8$, for turning-off the half-bridge $T_4$, $T_6T_2$, the thyristors $T'_7$, $T'_8$ being turned-on simultaneously with the thyristors $T_7$, $T_8$ respectively.

Figure 3:
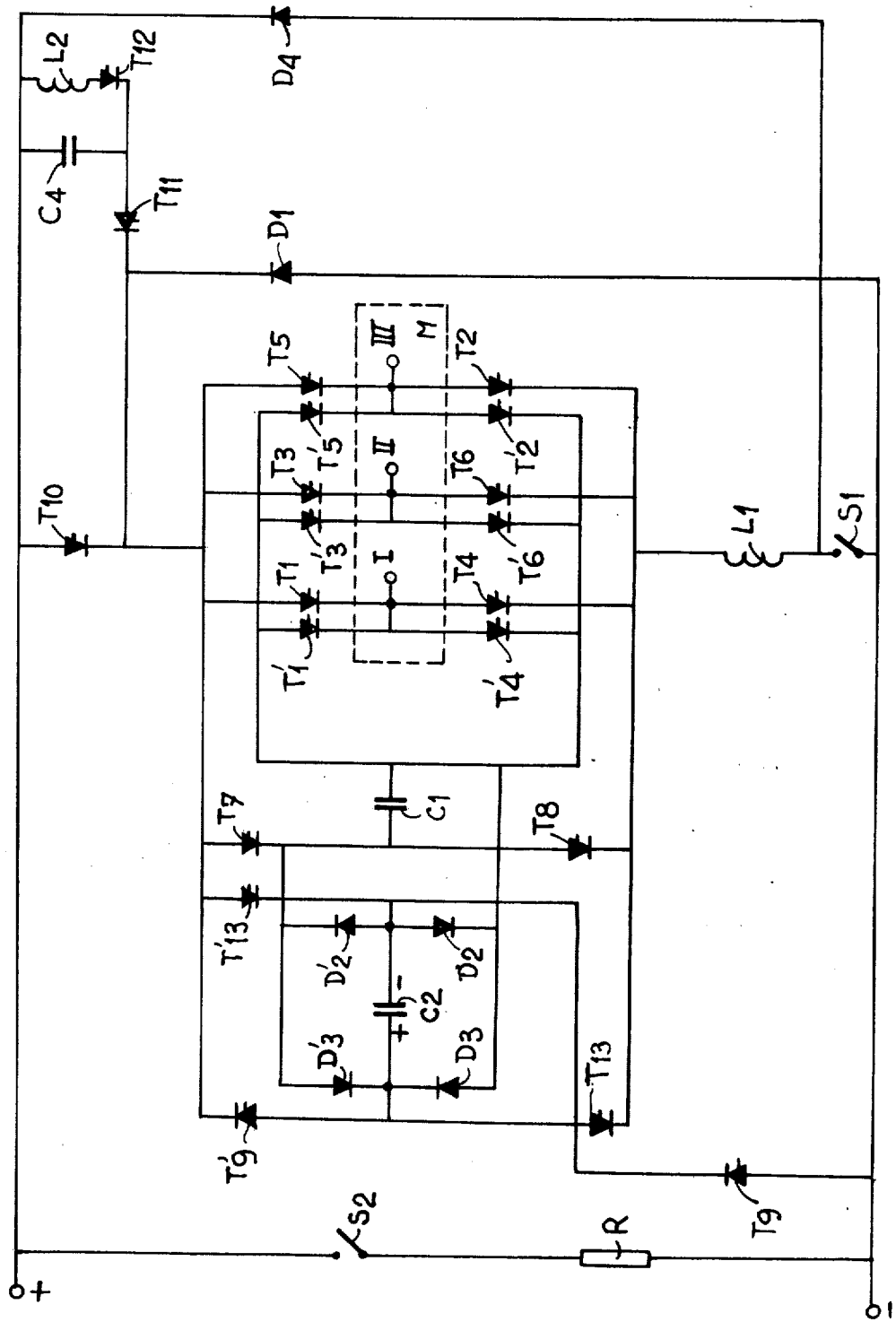
FIG. 3 shows a system comprising a thyristorized commutating bridge, a turn-off circuit and a switching circuit.

Like the system of FIG. 1, the system shown in FIG. 3 comprises a thyristorized commutating bridge $T'_1$, $T'_3$, $T'_5$, $T'_4$, $T'_6$, $T'_2$ but only a single switching circuit, in the form of the capacitor $C_2$ which is connected via the diode bridge $D_2$, $D'_2$, $D_3$, $D'_3$ across the capacitor $C_1$. The energy stored in capacitor $C_2$ at switching is returned to the motor M through the discharge circuit embodied by the thyristors $T'_9$ and $T_9$.

If a switch $S_1$, a diode $D_4$, and switch $S_2$ and a resistance 13. R are added, the system then enables the motor to operate as a generator ($S_1$ open) provided that power can be returned to the supply; if this is not the case, the power which would otherwise be returned to the supply can be used for rheostatic braking of the motor, to which end the whole system is disconnected from the supply and the switch $S_2$ is closed and substitutes the resistance R for the supply. In this kind of operation the energy stored in the capacitor $C_2$ at switching is returned to the motor via the discharge circuit embodied by thyristors $T_{13}$ and $T'_{13}$.

The system according to the invention is a means of giving an AC machine the characteristics of a DC machine.

The invention is of use more particularly for industrial speed controllers and for traction motor supply.

I claim:

1. A circuit for commutating current in the windings of an n-phase electrical machine, wherein said current is derived from a constant current supply having DC output terminals, said circuit comprising:
   a. a current chopper having one end connected to one of said DC supply output terminals for obtaining from said supply a DC current of an adjustable given value,
   b. an inductor having one end connected to the other one of said DC supply output terminals for smoothing the adjusted current obtained from said current chopper,
   c. a 2 n-arm thyristorized routing bridge having an input side and an output side with n center points, said n center points connected to the n-phase electrical machine, one side of said routing bridge connected to the other side of said current chopper, the other side of said routing bridge connected to the other side of said smoothing inductance,
   d. a 2 n-arm semiconductor bridge having an input side and an output side with n center points, said n center points connected to the n-phase electrical machine,
   e. turn-off circuit means connected between each side of said semiconductor bridge and a corresponding side of said routing bridge for turning off the routing thyristors of said routing bridge,
   f. switching circuit means connected between each side of said semiconductor bridge and a corresponding side of said routing bridge for progressively transferring current from the semiconductor bridge to the routing bridge, and
   g. discharge circuit means for discharging excess charge stored in the switching circuit means.

2. A circuit according to claim 1 wherein the semiconductors of the semiconductor bridge are thyristors.

3. A circuit according to claim 2 wherein the turn-off circuit means includes two turn-off circuits associated respectively with each side of said routing bridge and said semiconductor bridge and wherein each turn-off circuit comprises a capacitor in series with a thyristor, the capacitor being common to the two turn-off circuits.

4. A circuit according to claim 3 wherein the switching circuit means includes two switching circuits associated respectively with each side of said routing bridge and said semiconductor bridge and wherein each switching circuit comprises a capacitor in series with a diode.

5. A circuit according to claim 4 wherein the discharge circuit means includes two discharge circuits associated with each switching circuit, for returning stored energy to the electrical machine.

6. A circuit according to claim 5 wherein the capacitor of the switching circuit associated with the side of the routing bridge connected to the current chopper returns its stored energy to the electrical machine via a thyristor; and wherein the capacitor of the switching circuit associates with the side of the routing bridge connected to the smoothing inductor is connected in series between said smoothing inductor and another inductor, said capacitor returning its stored energy to the electrical machine via the smoothing inductor and said other inductor.

7. A system according to claim 3, comprising a single switching circuit for both sides of the routing bridge and the semiconductor bridge, said single switching circuit comprising a capacitor connected across a diode bridge, said diode bridge being connected in parallel across the turn-off capacitor.

8. A circuit according to claim 7 wherein the capacitor of the switching circuit restores its stored energy to the electrical machine via one of two circuits, each of said circuits comprising at least one thyristor on either side of the capacitor, one of said circuits enabling the machine to operate as a motor, the other of said circuits enabling the machine to operate as a generator.

9. A circuit according to claim 1 wherein the semiconductors of the semiconductor bridge are diodes.

10. A circuit according to claim 9 wherein the turn-off circuit means includes two turn-off circuits associated respectively with each side of said routing bridge circuit, and wherein each turn-off circuit comprises a capacitor in series between two thyristors, the capacitor being common to the two turn-off circuits.

11. A circuit according to claim 10 wherein the switching circuit means includes two switching circuits associated respectively with each side of said routing bridge and said semiconductor bridge and wherein each switching circuit comprises a capacitor in series with a diode.

12. A circuit according to claim 11 wherein the discharge circuit means includes two discharge circuits associated with each switching circuit, for returning stored energy to the electrical machine.

13. A circuit according to claim 12 wherein the capacitor of the switching circuit associated with the side of the routing bridge connected to the current chopper returns its stored energy to the electrical machine via a thyristor; and wherein the capacitor of the switching circuit associated with the side of the routing bridge connected to the smoothing inductor is connected in series between said smoothing inductor and another inductor, said capacitor returning its stored energy to the electrical machine via the smoothing inductor and said other inductor.

* * * * *